(12) United States Patent
Rivas-Davila et al.

(10) Patent No.: US 11,228,252 B2
(45) Date of Patent: Jan. 18, 2022

(54) APPARATUSES AND METHODS INVOLVING POWER CONVERSION USING MULTIPLE RECTIFIER CIRCUITS

(71) Applicant: The Board of Trustees of the Leland Stanford Junior University, Stanford, CA (US)

(72) Inventors: Juan M. Rivas-Davila, Palo Alto, CA (US); Lei Gu, Stanford, CA (US); Luke C. Raymond, Redwood City, CA (US); Sanghyeon Park, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/977,986

(22) PCT Filed: Mar. 7, 2019

(86) PCT No.: PCT/US2019/021181
§ 371 (c)(1),
(2) Date: Sep. 3, 2020

(87) PCT Pub. No.: WO2019/173610
PCT Pub. Date: Sep. 12, 2019

(65) Prior Publication Data
US 2021/0075333 A1    Mar. 11, 2021

Related U.S. Application Data

(60) Provisional application No. 62/639,865, filed on Mar. 7, 2018.

(51) Int. Cl.
H02M 3/335    (2006.01)
H02M 7/10    (2006.01)
(Continued)

(52) U.S. Cl.
CPC ......... *H02M 3/33592* (2013.01); *H02M 1/00* (2013.01); *H02M 3/33523* (2013.01);
(Continued)

(58) Field of Classification Search
CPC .... H02M 1/00; H02M 1/0064; H02M 1/0077; H02M 1/0083; H02M 3/01; H02M 3/335;
(Continued)

(56) References Cited

U.S. PATENT DOCUMENTS 2,431,261 A    11/1947    Little
5,157,593 A    10/1992    Jain
(Continued)

OTHER PUBLICATIONS

USPTO. International Search Report and Written Opinion dated May 17, 2019, for parent PCT Application No. PCT/US2019/021181, 8 pages.
(Continued)

*Primary Examiner* — Gary L Laxton
(74) *Attorney, Agent, or Firm* — Crawford Maunu PLLC

(57) ABSTRACT

An apparatus including direct-current (DC)-alternating-current (AC) inverter circuitry, first and second circuits, and output circuitry. The DC-AC inverter circuitry inverts a DC input signal corresponding to an input voltage to an AC signal. The first circuit and second circuits respectively include inductive isolation circuits driven in response to power from the at least one AC signal, and rectifier circuits that responds to the inductive isolation circuits by outputting first and second rectified signals, where at least one of the first and second rectifier circuits characterized as being limited by a voltage breakdown rating. The output circuitry provides a DC output voltage signal and to cascade a plurality of signals, including the first and second rectified
(Continued)

signals, to provide a voltage source that is dependent on the first and second rectified signals and greater than voltage breakdown rating.

18 Claims, 13 Drawing Sheets

(51) Int. Cl.
*H02M 1/00* (2006.01)
*H02M 3/00* (2006.01)
*H02M 7/04* (2006.01)

(52) U.S. Cl.
CPC ............ *H02M 7/10* (2013.01); *H02M 1/0077* (2021.05); *H02M 3/01* (2021.05); *H02M 3/33573* (2021.05); *H02M 7/05* (2021.05)

(58) Field of Classification Search
CPC ......... H02M 3/33523; H02M 3/33553; H02M 3/33569; H02M 3/33573; H02M 7/05; H02M 7/10
See application file for complete search history.

(56) References Cited

U.S. PATENT DOCUMENTS

| | | | |
|---|---|---|---|
| 6,907,097 | B2 | 6/2005 | Leung |
| 7,505,289 | B2 * | 3/2009 | Kim ..................... H02M 3/335 363/126 |
| 2011/0090717 | A1 | 4/2011 | Lee et al. |
| 2012/0039092 | A1 | 2/2012 | Xu et al. |
| 2016/0380429 | A1 * | 12/2016 | Krstic .................... H02H 7/125 307/77 |
| 2017/0012535 | A1 * | 1/2017 | Raymond ............... H02M 3/28 |
| 2018/0175741 | A1 * | 6/2018 | Andersen ............ H02M 3/1584 |

OTHER PUBLICATIONS

L. Raymond et al. "13.56 MHz high voltage multi-level resonant DC-DC converter." 2015 IEEE 16th Workshop on Control and Modeling for Power Electronics (COMPEL) 24(3): 408-416 (2015).

M.D. Bellar et al. "Analysis of the dynamic and steady-state performance of cockcroft-walton cascade rectifiers," IEEE Transactions on Power Electronics, vol. 7, No. 3, pp. 526-534, Jul. 1992. (Abstract Only).

M. Hernanz-Schulman et al. "Pause and pulse: ten steps that help manage radiation dose during pediatric fluoroscopy," American journal of roentgenology, vol. 197, No. 2, pp. 475-481, 2011.

A. Komarskiy, A. Chepusov, V. Kuznetsov, S. Korzhenevskiy, S. Niculin, and S. Cholakh, "Reducing radiation dose by using pulse x-ray apparatus," Journal of Biosciences and Medicines, vol. 2, No. 02, p. 17, 2014.

D. C. Hamill. "Class de inverters and rectifiers for dc-dc conversion," in Power Electronics Specialists Conference, 1996. PESC '96 Record., 27th Annual IEEE, vol. 1, Jun. 1996, p. 854-860 vol. 1. (Abstract Only).

K. N. Bateson, "Class de dc-dc converters," in Computers in Power Electronics, 1998. 6th Workshop on, 1998, pp. 119-125. (Abstract Only).

C. Ekkaravarodome et al. "Single-Stage Fluorescent Lamps Electronic Ballast Using Class-DE Low dv/dt Rectifier for Power-Factor Correction," IEEE Transactions on Industrial Electronics, vol. 57, No. 10, pp. 3405-3414, Oct. 2010. (Abstract Only).

C. Ekkaravarodome et al. "Ilmplementation of a DC-Side Class-DE Low-du/dtdu/dt Rectifier as a PFC for Electronic Ballast Application," IEEE Transactions on Power Electronics, vol. 29, No. 10, pp. 5486-5497, Oct. 2014. (Abstract Only).

K. Fukui and H. Koizumi, "Analysis of half-wave class de low dv/dt rectifier at any duty ratio," IEEE Transactions on Power Electronics, vol. 29, No. 1, p. 234-245, Jan. 2014. (Abstract Only).

S. Park, L. Gu and J. Rivas-Davila, "60 V-to-35 kV input-parallel output-series DC-DC converter using multi-level class-DE rectifiers," 2018 IEEE Applied Power Electronics Conference and Exposition (APEC), pp. 2235-2241 (filed as Appendix A of the underlying US. Provisional Application).

M.D. Bellar et al. "Analysis of the dynamic and steady-state performance of cockcroft-walton cascade rectifiers," IEEE Transactions on Power Electronics, vol. 7, No. 3, pp. 526-534, Jul. 1992. (also cited in IDS filed Sep. 3, 2020).

D. C. Hamill. "Class de inverters and rectifiers for dc-dc conversion," in Power Electronics Specialists Conference, 1996. PESC '96 Record., 27th Annual IEEE, vol. 1, Jun. 1996, p. 854-860 vol. 1. (also cited in IDS filed Sep. 3, 2020).

K. N. Bateson, "Class de dc-dc converters," in Computers in Power Electronics, 1998. 6th Workshop on, 1998, pp. 119-125. (also cited in IDS filed Sep. 3, 2020).

C. Ekkaravarodome et al. "Single-Stage Fluorescent Lamps Electronic Ballast Using Class-DE Low dv/dt Rectifier for Power-Factor Correction," IEEE Transactions on Industrial Electronics, vol. 57, No. 10, pp. 3405-3414, Oct. 2010. (also cited in IDS filed Sep. 3, 2020).

C. Ekkaravarodome et al. "Ilmplementation of a DC-Side Class-DE Low-du/dtdu/dt Rectifier as a PFC for Electronic Ballast Application," IEEE Transactions on Power Electronics, vol. 29, No. 10, pp. 5486-5497, Oct. 2014. (also cited in IDS filed Sep. 3, 2020).

K. Fukui and H. Koizumi, "Analysis of half-wave class de low dv/dt rectifier at any duty ratio," IEEE Transactions on Power Electronics, vol. 29, No. 1, p. 234-245, Jan. 2014. (also cited in IDS filed Sep. 3, 2020).

* cited by examiner

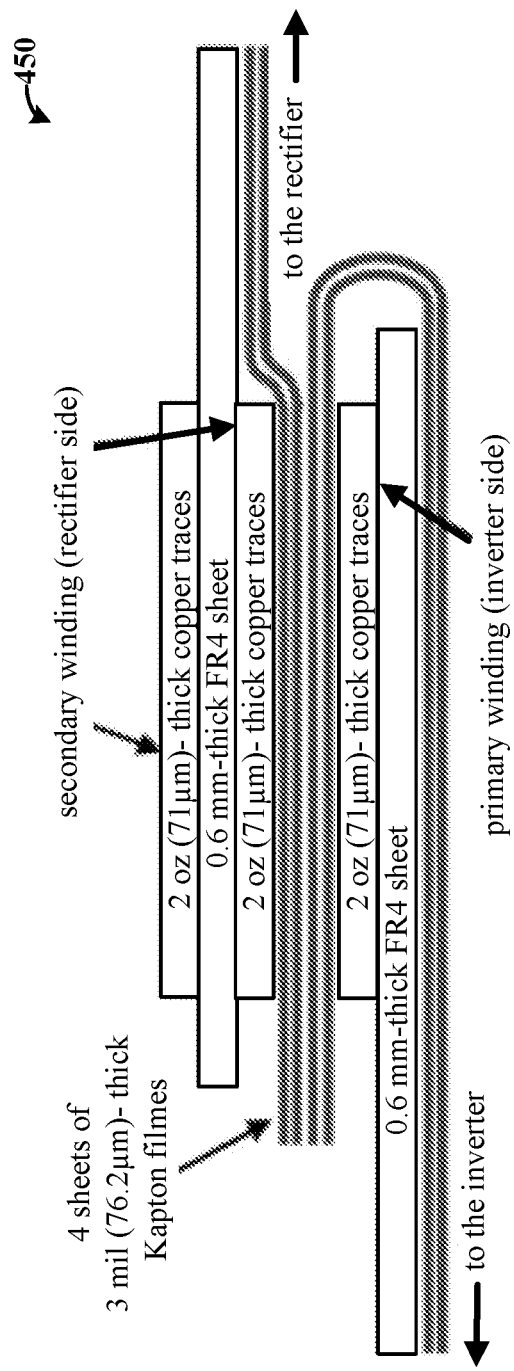
FIG. 4A
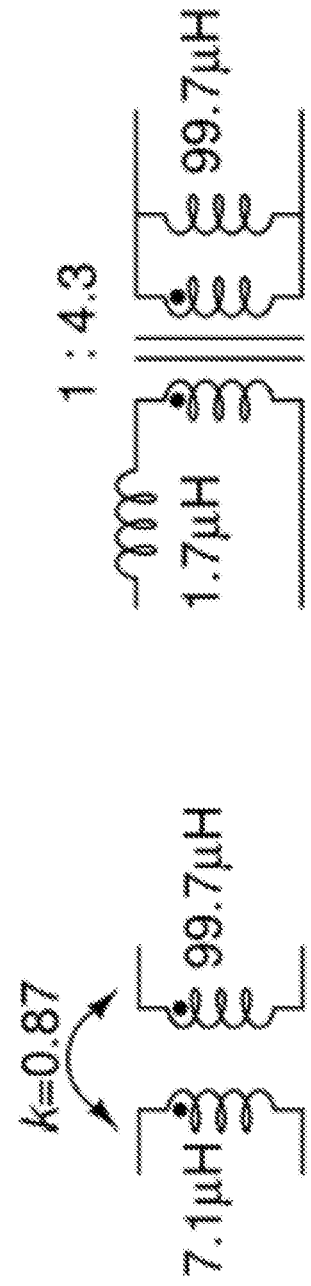
FIG. 4B
FIG. 4C

APPARATUSES AND METHODS INVOLVING POWER CONVERSION USING MULTIPLE RECTIFIER CIRCUITS

OVERVIEW

High-voltage (e.g., 10-100 kilovolts) low-current (1-100 milliampere) power supply can be beneficial in many applications, among others, including the medical, environmental, security, and aerospace fields. Further, enhanced portability of a high-voltage device can lead to new usages of the technology, better performance, and/or new applications.

The above issues as well as others have presented challenges to power conversion for a variety of applications.

SUMMARY

Aspects of various embodiments are directed to apparatuses and/or methods involving power conversion using multiple rectifier circuits. In the following discussion, various implementations and applications are disclosed to provide an understanding of the instant disclosure by way of non-limiting example embodiments.

Various aspects are directed to and/or involve power conversion provided by a plurality of stacked rectifier circuits, at least one of the rectifier circuits having inductive isolation between a front-end portion and a back-end portion to enable use of the back-end portion for delivering power-converted output-stage signals with a steady-state voltage that is significantly greater than a voltage stress/breakdown rating associated with one or more components of the front-end portion.

A number of aspects are directed to a power converter having a class-DE resonant rectifier with capacitive direct current (DC) isolation that generates several hundreds of volts. As the rectifier diodes and output terminals are DC-isolated from the input, tens of units of the rectifier can be stacked such that the signals output by the units are in series to generate an output voltage of several kilovolts. In this configuration, the output voltage can be up to twice the voltage rating of DC-isolation capacitors as the voltage stress on capacitors of top and bottom rectifiers is half of the total output voltage, provided that the isolated total output voltage diverges symmetrically toward positive and negative directions. To achieve a higher output voltage, various embodiments include an air-core transformer which acts as an additional DC-isolation barrier. Multiple units of the multi-stage class-DE rectifiers can be cascaded, as described above. Using such an example configuration, a high output voltage can be generated because the limit of the achievable voltage is now the breakdown voltage of the inductive isolation barrier between the transformer's primary and secondary windings.

More specific aspects are directed to an apparatus that includes DC-alternating-current (AC) inverter circuitry, first and second circuits, and output circuitry. The DC-AC inverter circuitry inverts at least one DC input signal corresponding to an input voltage to at least one AC signal. The first circuit includes a first inductive isolation circuit to be driven in response to power from the at least one AC signal and a first rectifier circuit. The first rectifier circuit responds to the first inductive isolation circuit by outputting a first rectified signal at a first pair of output terminals. The second circuit includes a second inductive isolation circuit to be driven in response to power from the at least one AC signal and includes a second rectifier circuit. The second rectifier circuit responds to the second inductive isolation circuit by outputting a second rectified signal at a second pair of output terminals. At least one of the first and second rectifier circuits are characterized as being limited by a voltage breakdown rating. The output circuit provides a DC output voltage signal between voltage source terminals and cascades a plurality of signals, including the first and second rectified signals, by one of the output terminals of one of the pairs of output terminals being a source of supply to one of the output terminals of the other of the pairs of output terminals. The voltage source terminals provide a voltage source that is dependent on the first and second rectified signals and is greater than the voltage breakdown rating of the at least one of the first and second rectifier circuits.

In related and mores specific aspects, each of the first and second rectifier circuits includes or is configured as a Class DE rectifier and/or each of the rectifier circuits is one of multiple rectifier stages connected in parallel. The voltage breakdown rating is defined by a DC-blocking capacitor used in a signal path in one of the first and second circuits, between an output terminal of the inductive isolation circuit and a diode in the rectifier circuit. In specific embodiments, the at least one of the first and second rectifier circuits delivers in the associated rectified signal, a DC output voltage signal that is greater than twice the voltage breakdown rating of the at least one of the first and second rectifier circuits. In more specific and related embodiments, the DC output voltage signal that is greater than three times, four times, five times, six time or more of the voltage breakdown rating.

At least one of the first and second inductive isolation circuits is associated with another voltage breakdown rating which is greater than the voltage breakdown rating of the at least one of the first and second rectifier circuits. For example, each of the first and second inductive isolation circuits includes an air-core transformer having an associated voltage breakdown rating that is greater than the voltage breakdown rating of the at least one of the first and second rectifier circuits and defines a minimum overall voltage breakdown rating for circuitry included in the inductive isolation circuit.

In a number of related aspects, the apparatus further includes additional rectifier circuits having outputs cascaded with the first and second rectifier circuits. Each of the rectifier circuits includes or is configured as a Class DE rectifier, is DC-isolated from the input voltage, and/or is rated at not less than 300 volts. For example, the apparatus further includes at least one additional circuit including a third circuit having a third inductive isolation circuit to be driven in response to power from the at least one AC signal, and including a third rectifier circuit to respond to the third inductive isolation circuit by outputting a third rectified signal at a third pair of output terminals. The output circuitry provides a DC output voltage signal between voltage source terminals and cascades a plurality of signals, including the first, second and third rectified signals, by coupling selected ones of the output terminals of the first, second and third pairs of output terminals as being a cascaded source of supply, with the first, second and third voltage source terminals collectively arranged to provide a voltage source that is dependent on the first, second and third rectified signals and that is greater than the voltage breakdown rating. In such a configuration, the input terminals to the multiple rectifier circuits are in parallel and the output terminals are in series.

Other aspects are directed to a DC power source for providing a DC voltage in response to at least one AC signal associated with an input voltage signal. The DC power source includes a first circuit, a second circuit, and output circuitry. The first circuit includes a first inductive isolation circuit to be driven in response to power from the at least one AC signal, and including a first rectifier circuit to respond to the first inductive isolation circuit by outputting a first rectified signal at a first pair of output terminals. The second circuit includes a second inductive isolation circuit to be driven in response to power from the at least one AC signal, and including a second rectifier circuit to respond to the second inductive isolation circuit by outputting a second rectified signal at a second pair of output terminals, and at least one of the first and second rectifier circuits characterized as being limited by a voltage breakdown rating. The output circuitry provides a DC output voltage signal between voltage source terminals and cascades a plurality of signals, including the first and second rectified signals, by one of the output terminals of one of the pairs of output terminals being a source of supply to one of the output terminals of the other of the pairs of output terminals, with the voltage source terminals to provide a voltage source that is dependent on the first and second rectified signals and is greater than the voltage breakdown rating of the at least one of the first and second rectifier circuits.

As described above, each of the first and second inductive isolation circuits includes an air-core transformer having another voltage breakdown rating associated with material between the windings of the air-core transformer and which is greater than the voltage breakdown rating of the at least one of the first and second rectifier circuits. The at least one of the first and second rectifier circuits includes a DC-blocking capacitor used in a signal path in one of the first and second circuits, between an output terminal of the inductive isolation circuit and a diode in the rectifier circuit. The DC-blocking capacitor is characterized as being limited by the voltage breakdown rating. The apparatus can further include a plurality of circuits, including the first and second circuits, cascaded in an arrangement between voltage rails, and the at least one of the first and second rectifier circuits is respectively situated closet to one of the voltage rails.

In a number of related and more specific aspects, the DC power source and/or an apparatus that includes the DC power source further includes front-end driver circuitry that provides the at least one AC signal to the first inductive isolation circuit and the second inductive isolation circuit. In more specific aspects, the front-end driver circuitry includes one or more DC-AC inverter circuits configured and arranged to invert at least one DC input signal corresponding to the input voltage signal to the at least one AC signal and to drive the first inductive isolation circuit and the second inductive isolation circuit via the at least one AC signal. In other aspects, the front-end driver circuitry includes one or more AC-AC inverter circuits configured and arranged to invert at least one AC input signal, corresponding to the input voltage signal and a first frequency, to the at least one AC signal corresponding to a second frequency and to drive the first inductive isolation circuit and the second inductive isolation circuit via the at least one AC signal at the second frequency.

A number of aspects are directed to methods of converting power using one or more of the above-described apparatuses. The method includes providing from a direct-current (DC) voltage input signal at least one alternating-current (AC) signal, and using a first circuit and a second circuit in parallel, each providing inductive isolation and each driven in response to power from the at least one AC signal, and each rectifying in response to the inductive isolation by outputting a rectified signal at an associated pair of output terminals. The rectifying associated with at least one of the first circuit and second circuits is associated with circuitry characterized as being limited by a voltage breakdown rating. The method further includes providing a DC output voltage signal between voltage source terminals by cascading a plurality of signals, including the rectified signals, with the DC output voltage signal being dependent on the rectified signals and being greater than the voltage breakdown rating.

Accordingly, various embodiments are directed to addressing challenges relating to the above aspects and others, as may benefit a variety of power converters and/or multi-stage rectifiers. The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which:

FIGS. 4A-4C show experimental examples if inductive isolation circuitry of an apparatus, in accordance with various embodiments of the present disclosure;

Figure 1:
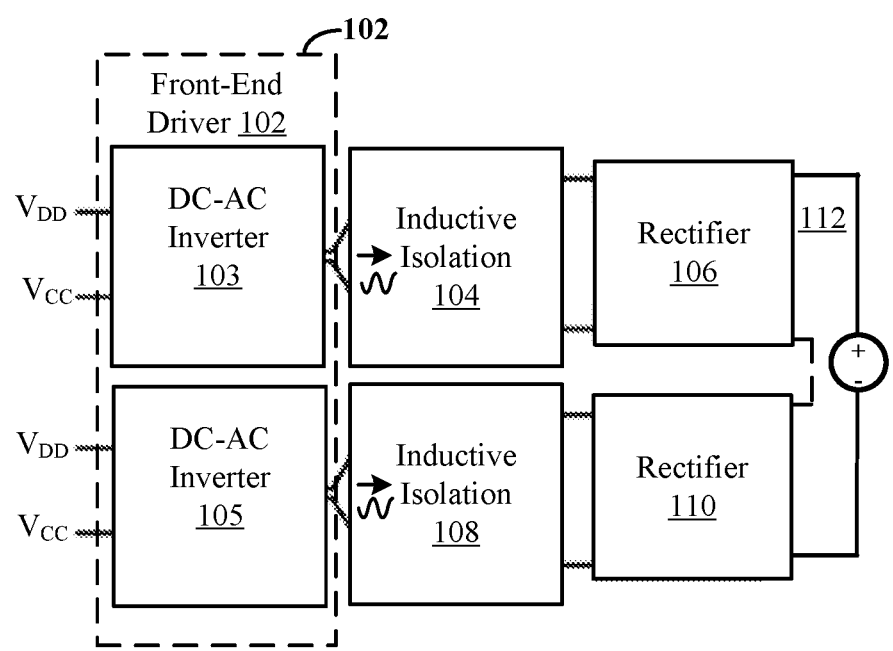
FIG. 1 shows an example of an apparatus involving power conversion, in accordance with various embodiments of the present disclosure.

While various embodiments discussed herein are amenable to modifications and alternative forms, aspects thereof have been shown by way of example in the drawings and will be described in detail. It should be understood, however, that the intention is not to limit the disclosures to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving a power conversion using multiple rectifier circuits. In specific embodiments, the power conversion apparatus outputs a voltage that is greater than twice the breakdown voltage rating of a capacitor of the multiple rectifier circuits cascaded in a stack. While the present invention is not necessarily limited to such applications, various aspects of the invention may be appreciated through a discussion of various examples using this context.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Particular example embodiments are directed to a power converter having a plurality of stacked rectifier circuits which are inductively isolated. For example, at least one of the rectifier circuits has inductive isolation between a front-end portion and a back-end portion to enable use of the back-end portion for delivering power-converted output-stage signals with a steady-state voltage that is significantly greater than a voltage breakdown rating associated with one or more components of the back-end portion. The one or more components can include one or more DC-blocking capacitor(s) of a rectifier circuit which provide DC isolation to rectifier diodes. Further inductive isolation is provided by an inductive isolation circuit, such as an air-core transformer, that is between the front and back-end portions. The front-end portion is herein referred to as "front-end driver circuitry." The back-end portion includes multiple rectifier circuits. The inductive isolation circuitry can increase a maximum output voltage of the power conversion circuit, as compared to the voltage breakdown rating associated with the one or more components of the back-end portion. For example, embodiments can include inductively isolating the front-end driver circuitry from the rectifier circuits while using the rectifier circuits to deliver power-converted output-stage signals with a steady-state voltage that is greater than twice a voltage breakdown rating associated with the component of each rectifier circuit. Such embodiments can include use of a plurality of rectifier circuits in a cascaded arrangement between voltage rails with at least one of the two rectifier circuits respectively situated closest to the voltage rails.

Certain embodiments are directed to addressing challenges relating to high DC voltage. Various systems, apparatuses, and/or methods can benefit from high DC voltage, in the range of tens of kilovolts (kV) or higher. To enhance the portability of the-below described, and more, devices without compromising their performance, a small, lightweight, and high-wattage power supply is often used. As further described herein, various embodiments are directed to a small, lightweight, high-voltage power (e.g., DC-DC) converter having a fast transient response that can be used for a variety of applications. Some example systems, apparatuses, and/or methods include an Electrostatic Precipitator (ESP), x-ray sources and neutron generators for airport security, ordinance and explosive detections, and medical equipment, such as dental X-ray or Computed Tomography (CT) scanners.

Certain aspects of the present disclosure are directed towards power conversion provided by a plurality of stacked rectifier circuits, such as multi-stage Class DE rectifiers with inductive isolation that exceeds the limit set by the capacitor voltage rating of the Class DE rectifier. The insertion of an air-core transformer enhances the DC voltage blocking capability to the breakdown voltage of the material between transformer windings. Moreover, parallel connection of the stages enable fast rise time, making the circuit particularly suitable for systems that require pulsed DC voltage. Various embodiments include a plurality of stacked rectifier circuits, such as a multi-stage class-DE rectifier that allows for connecting all the input terminals (or ports) of rectifiers in parallel and output terminals (or ports) in series, thereby delivering current from the input to every node simultaneously. In such a configuration, the maximum number of rectifier stages that can be cascaded is limited by the voltage rating of the DC-blocking capacitor at the top and bottom stages, and therefore the output voltage of the converter may not exceed twice the voltage rating of the capacitor. More specific embodiments in accordance with the present disclosure involve a plurality of stacked rectifier circuits with inductive isolation that breaks the limit set by the capacitor voltage rating. The insertion of an air-core transformer enhances the DC voltage blocking capability to the breakdown voltage of the material between transformer windings. Moreover, parallel connection of the stages enable fast rise time, making the circuit particularly suitable for systems that require pulsed DC voltage.

Specific example embodiments are directed to methods and/or apparatuses comprising and/or involving an apparatus that includes DC-AC inverter circuitry, first and second circuits, and output circuitry. The DC-AC inverter circuitry inverts at least one DC input signal corresponding to an input voltage to at least one AC signal. The first circuit includes a first inductive isolation circuit that is driven in response to power from the at least one AC signal and a first rectifier circuit. The first rectifying circuit responds to the first inductive isolation circuit by outputting a first rectified signal at a first pair of output terminals. The second circuit includes a second inductive isolation circuit that is driven in response to power from the at least one AC signal and includes a second rectifier circuit. The second rectifying circuit responds to the second inductive isolation circuit by outputting a second rectified signal at a second pair of output terminals. At least one of the first and second rectifier circuits are characterized as being limited by a voltage breakdown rating. The output circuit provides a DC output voltage signal between voltage source terminals and cascades a plurality of signals, including the first and second rectified signals, by one of the output terminals of one of the pairs of output terminals being a source of supply to one of the output terminals of the other of the pairs of output terminals. The voltage source terminals provide a voltage source that is dependent on the first and second rectified signals and greater than the voltage breakdown rating of the at least one of the first and second rectifier circuits.

In related and more specific embodiments, each of the rectifier circuits includes or is configured as a Class DE rectifier and/or each of the rectifier circuits is one of multiple rectifier stages connected in parallel. The voltage breakdown rating is defined by a DC-blocking capacitor used in a signal path in one of the first and second circuits, between an output terminal of the inductive isolation circuit and a diode in the rectifier circuit. In specific embodiments, the at least one of the rectifier circuits delivers in the associated rectified signal, a DC output voltage signal that is greater than twice the voltage breakdown rating of the at least one of the first and second rectifier circuits.

At least one of the inductive isolation circuits can be associated with another voltage breakdown rating which is greater than the voltage breakdown rating of the at least one of the first and second rectifier circuits. For example, each of the first and second inductive isolation circuits includes an air-core transformer having an associated voltage breakdown rating that is greater than the voltage breakdown rating of said at least one of the first and second rectifier circuits and defines a minimum overall voltage breakdown rating for circuitry included in the inductive isolation circuit.

The above-described apparatus can further include additional rectifier circuits having outputs cascaded with the first and second rectifier circuits. Each of the rectifier circuits includes or is configured as a Class DE rectifier, is DC-isolated from the input voltage, and/or is rated at not less than 300 volts. For example, the apparatus further includes at least one additional circuit including a third circuit having a third inductive isolation circuit driven in response to power from the at least one AC signal, and including a third rectifier circuit to respond to the third inductive isolation circuit by outputting a third rectified signal at a third pair of output terminals. The output circuitry provides a DC output voltage signal between voltage source terminals and to cascade a plurality of signals, including the first, second and third rectified signals, by coupling selected ones of the output terminals of the first, second and third pairs of output terminals as being a cascaded source of supply, with the first, second and third voltage source terminals collectively arranged to provide a voltage source that is dependent on the first, second and third rectified signals and that is greater than the voltage breakdown rating.

Other embodiments are directed to a DC power source for proving a DC voltage in response to at least one AC signal associated with an input voltage signal. The DC power source includes the above-described first circuit, second circuit, and output circuitry. As described above, the first and second inductive isolation circuits can each include an air-core transformer having another voltage breakdown rating associated with material between the windings of the air-core transformer and that is greater than the voltage breakdown rating of said at least one of the first and second rectifier circuits. The at least one of the first and second rectifier circuits includes a DC-blocking capacitor used in a signal path in one of the first and second circuits with the DC-blocking capacitor being characterized as being limited by the voltage breakdown rating. The apparatus can further include a plurality of circuits, including the first and second circuits, cascaded in an arrangement between voltage rails, and the at least one of the first and second rectifier circuits is respectively situated closest to one of the voltage rails.

In a number of related and more specific embodiments, the apparatus further includes front-end driver circuitry that provides the at least one AC signal to the first inductive isolation circuit and the second inductive isolation circuit. The front-end driver circuitry can include one or more DC-AC inverter circuits that inverts at least one DC input signal corresponding to the input voltage to the at least one AC signal and to drive the first inductive isolation circuit and the second inductive isolation circuit via the at least one AC signal. In other embodiment, the front-end driver circuitry includes one or more AC-AC inverter circuits that invert at least one AC input signal corresponding to a first frequency (and the input voltage) to the at least one AC signal corresponding to a second frequency and to drive the first inductive isolation circuit and the second inductive isolation circuit via the at least one AC signal at the second frequency.

One or more embodiments are directed to systems and/or methods involve a Computed Tomography (CT) scanner gantry and other device having a high-speed rotating member, such as a rotating gantry member (e.g., a centrifuge-type device). The CT scanner involves that above-described power converter. The CT scanner is designed and/or configured based on the power conversion circuitry and its weight, which allows for faster rotation speed, the upper speed of which is limited at least in part due to the power conversion circuitry used to provide power thereto. For example, the overall specification of the CT scanner and its weight is associated with a specific rotation speed that the gantry spins at. Faster rotation speeds, in conjunction with shorter output voltage rise and fall, can lead to reduced radiation exposure to patients as the faster rotation speed exposes the patient to the radiation (e.g., localized radiation) for a shorter period of time.

One or more other embodiments are directed to a machine involving a traveling wave tube (TWT) radar power supply that has the above-described power conversion circuitry. The power conversion circuitry can reduce the size of the entire system allowing more powerful radar systems to be used in mobile applications or putting such radar on smaller vehicles (e.g. drones, automobiles, etc.) that have historically been too large due to system size and weight. For example, the weight of the machine is dependent upon a weight associated with power conversion circuitry used for powering circuitry used for the provision of the electrostatic adhesion.

As may be appreciated by one of ordinary skill, embodiments are not limited to the above listed systems and/or methods. Other example systems and/or methods involving the above-described power conversion can include an electrostatic sprayer, an electro-hydrodynamic propulsion system, high power laser power supplies, tasers, particle accelerators, plasma generators, capacitor charging, and ozone generation, among other types of systems and/or methods. Some embodiments include or involve a medical system (e.g., X-ray emission machine) that includes a gantry capable of delivering a voltage-based radiation dose to a patient, the medical system being designed/configured with the gantry configured to rotate at high speeds, an upper speed of which is limited at least in part due to power conversion circuitry, wherein the radiation dose is specified at least in part by the upper speed of the gantry. Other embodiments include or involve an ion source machine (e.g., X-ray emission machine, linear accelerator, neutron generator for bomb detection, drill head/system configured to drill/image for oil logging and geological exploration) including a voltage-based member, or voltage-based gantry, the ion source machine being configured and arranged for mobility as a portable machine, and wherein the weight of the portable machine is dependent upon a weight associated with power conversion circuitry used for effecting rotation of the voltage-based member, or voltage-based gantry. Additional embodiments include or involve a machine configured to provide an electrostatic adhesion, wherein the weight of the machine is dependent upon a weight associated with power conversion circuitry used for powering circuitry used for the provision of the electrostatic adhesion.

The above-describe apparatuses can be used to implement a variety of methods for converting power, as further described herein.

Turning now to the figures, FIG. 1 shows an example of an apparatus involving power conversion, in accordance with various embodiments of the present disclosure. As shown, the apparatus includes front-end driver circuitry 102, a first circuit and a second circuit (as further described below) and output circuitry 112. The apparatus includes, in various embodiments, a power converter which includes inverter circuitry, inductive isolation circuitry, and rectifier circuits in a cascaded arrangement. As further described herein, the first circuit and second circuit respectively include inductive isolation circuits 104, 108 and rectifier circuits 106, 110.

The front-end driver circuitry 102 presents an oscillating signal to the inductive isolation circuits 104, 108, such as one or more AC signals. The front-end driver circuitry 102, in specific embodiments, includes one or more DC-AC inverter circuits 103, 105 that invert at least one DC input signal (e.g., VDD) corresponding to an input voltage to at least one AC signal. Although illustrated as a one-to-one correspondence with later stages, e.g., first and second circuits, embodiments are not so limited. The at least one AC signal is used to drive the first and second circuits. Additionally, embodiments are not limited to DC-AC inverter circuits. For example, the front-end driver circuitry 102 can include circuitry that provides an oscillating signal. In some specific embodiments, front-end driver circuitry 102 includes one or more AC-AC inverter circuits that invert an input AC signal at a first frequency to output AC signal at a second frequency. In other embodiments and/or in addition, the front-end driver circuitry 102 directly derives the AC signal.

Each of the first and second circuits include respective inductive isolation circuits 104, 108 and rectifier circuits 106, 110. For example, the first circuit includes a first inductive isolation circuit 104 that is driven in response to power from the at least one AC signal and a first rectifier circuit 106. The first rectifier circuit 106 responds to the first inductive isolation circuit 104 by outputting a first rectified signal at a first pair of output terminals. The second circuit includes a second inductive isolation circuit 108 that is driven in response to power from the at least one AC signal and a second rectifier circuit 110 that responds to the second inductive isolation circuit 108 by outputting a second rectified signal at a second pair of output terminals. As further illustrated herein, the first and/or second rectifier circuits 106, 110 include one or more DC-blocking capacitors used in a signal path in the one of the first and second circuits, between an output terminal of the inductive isolation circuit 104 and/or 108 and a diode in the rectifier circuit 106 and/or 110. For example, the first and/or second rectifier circuits 106, 110 are configured as Class DE rectifiers. In such embodiments, the first and/or second circuits are characterized as being limited by a voltage breakdown rating, which may be associated with the DC-blocking capacitor. As may be appreciated and as further described herein, capacitors may have voltage breakdown ratings which define the breakdown of the capacitor.

The first and second inductive isolation circuits 104, 108 include transformers, such as air-core transformers. One or more of the first and second inductive isolation circuits 104, 108 are associated with another voltage breakdown which is greater than the voltage breakdown rating of the at least one of the first and second rectifier circuits 106, 110 and/or defines a minimum overall voltage breakdown for circuitry included in the first and second inductive isolation circuits 104, 108.

The rectifier circuits can be in a cascaded arrangements and the output circuitry 112 effects or provides the cascading connections between the rectifier circuits 106, 110. As used herein, the output circuitry 112 includes or refers to at least the wires which are used to effect the cascading connections of the rectifier circuits. For example, the output circuitry 112 provides a DC output voltage signal between voltage source terminals and cascades a plurality of signals, including the first and second rectified signals, by one of the output terminals of one of the pairs of output terminals being a source of supply to one of the output terminals of the other of the pairs of output terminals. The voltage source terminals provide a voltage source that is dependent on the first and second rectified signals and greater than the voltage breakdown rating of the at least one of the first and second rectifier circuits. As further described herein, at least one of the rectifier circuits 106, 110 can deliver in the associated rectified signal, a DC output voltage signal that is greater than twice the voltage breakdown rating of the at least one of the first and second rectifier circuits.

In specific embodiments, each of the rectifier circuits 106, 110 is one of multiple rectifier stages connected via the output circuitry 112. For example, the input terminals are in parallel and the output terminals are in series. Although the embodiment of FIG. 1 illustrates two stages (e.g., two rectifiers), embodiments are not so limited. For example, the apparatus can include additional rectifier circuits having outputs cascaded with the first and second rectifier circuits 106, 110. Each of the rectifier circuits includes or is configured as a Class DE rectifier, is dc-isolated from the input voltage and/or is rated at not less than 300 volts. As a more specific example, the apparatus can include at least one additional circuit that includes a third circuit having a third inductive isolation circuit to be driven in response to power from the at least one AC signal, and including a third rectifier circuit to respond to the third inductive isolation circuit by outputting a third rectified signal at a third pair of output terminals. The output circuitry 112 provides a DC output voltage signal between voltage source terminals and cascades a plurality of signals, including the first, second and third rectified signals, by coupling selected ones of the output terminals of the first, second and third pairs of output terminals as being a cascaded source of supply, with the first, second and third voltage source terminals collectively arranged to provide a voltage source that is dependent on the first, second and third rectified signals and that is greater than the voltage breakdown rating.

Although the embodiment of FIG. 1 illustrates the apparatus including the front-end driver circuitry 102, embodiments are not so limited. For example, the apparatus can include a DC-power source for providing a DC voltage in response to at least one AC signal associated with an input voltage signal. The DC power source includes above described first circuit (e.g., the first inductive isolation circuit 104 and the first rectifier circuit 106), the second circuit (e.g., the second inductive isolation circuit 108 and the second rectifier circuit) and the output circuitry 112, as previously described and illustrated by FIG. 1.

The above-described apparatus can include a power converter that includes the one or more rectifier circuits with inductive isolation that breaks a limit set by the capacitor voltage rating. The use of an air-core transformer enhances the DC voltage blocking capability to the breakdown voltage of the material between transformer windings. Moreover, parallel connection of rectifier stages enable sufficient rise time, making the circuit suitable for systems that require pulsed DC voltage.

Figure 2A:
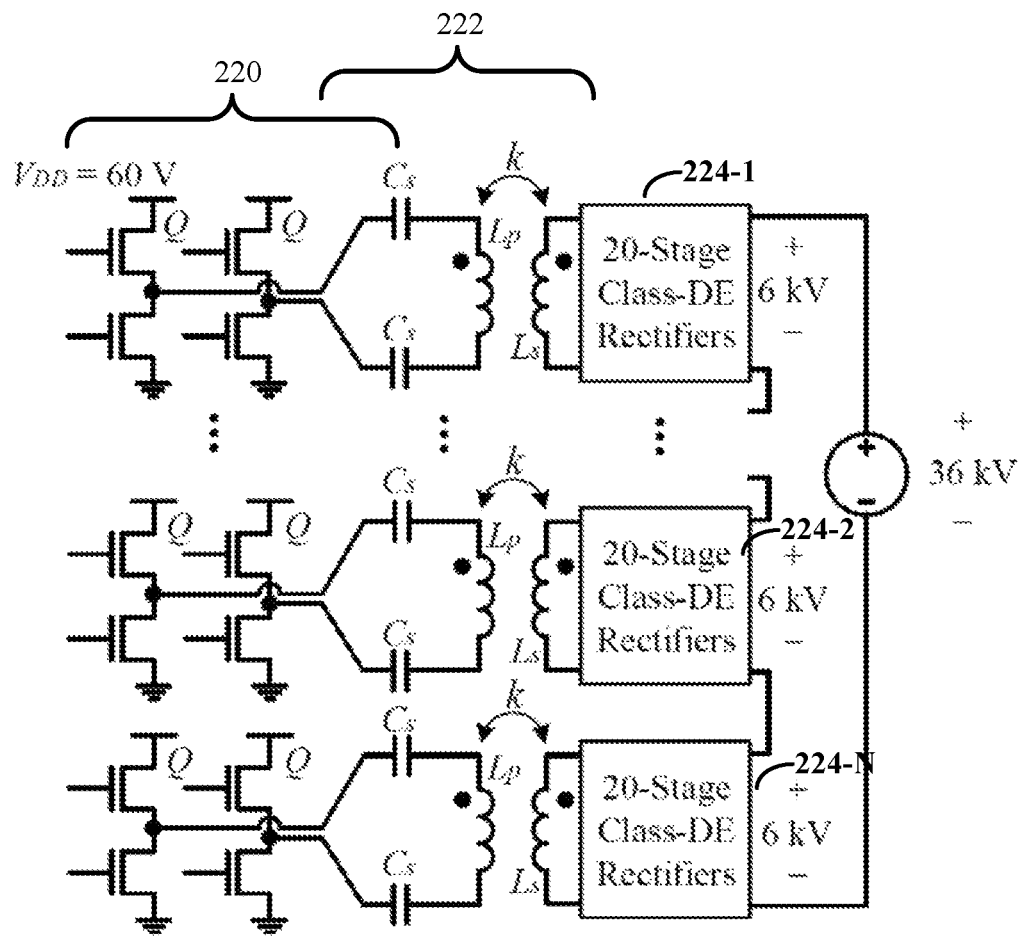
FIGS. 2A-2B shows another example of an apparatus involving power conversion, in accordance with various embodiments of the present disclosure.
Figure 2B:
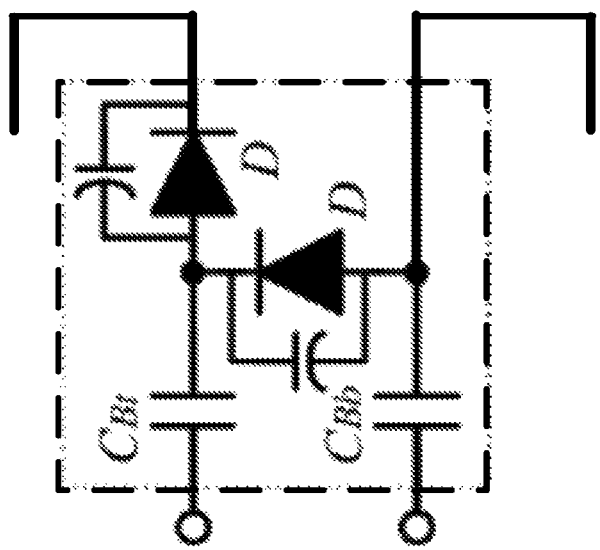

FIGS. 2A-2B shows another example of an apparatus involving power conversion, in accordance with various embodiments of the present disclosure. The apparatus illustrated by FIG. 2A, similarly to that illustrated by FIG. 1, includes inverter circuits 220, inductive isolation circuits 222, and multiple rectifier circuits 224-1, 224-2 . . . 224-N (herein referred to as "the rectifier circuits 224" for ease of reference).

The rectifier circuits 224 can be arranged as multi-stage class-DE rectifiers. Respective rectifiers circuits 224 are connected via output circuitry that connects the input terminals (or ports) of the rectifiers in parallel and the output terminals (or ports) in series, thereby delivering current from the input to each of the rectifier circuits 224 simultaneously. The rectifier circuits are thereby in a cascaded arrangement. The apparatus can include a plurality of circuits, including the illustrated first circuit and second circuit of FIG. 1, cascaded in an arrangement between voltage rails. At least the circuits that are respectively situated closest to the voltage rails, and in some embodiments all of the circuits, can include Class DE rectifiers having at least one DC-blocking capacitor that are coupled to air-core transformers used to provide further isolation. In specific embodiments, the rectifier circuits in the stack can have parallel connected input ports/terminals and output terminals in series (e.g., via the output circuitry).

An example of a class-DE rectifier 224-2 with output circuitry is illustrated by FIG. 2B. As shown, the class-DE rectifier includes one or more DC-blocking capacitors which isolate the rectifier diodes when the rectifier circuits 224 are outputting the DC output voltage signal. More specifically, the DC-blocking capacitor(s) is used in a signal path of the one or more of the first and second circuits, between an output terminal of the inductive isolation circuit and a diode in the rectifier circuit. As the rectifier diodes and output terminals are DC-isolated from the input, multiple units of rectifiers are stacked such that the rectifier output terminals are in series and used to provide a particular voltage output. In some embodiments, twenty 300 V rectifiers are stacked and used to provide a 6 kV voltage output, although embodiments are not so limited. As previously described, the DC-blocking capacitors are characterized by a voltage breakdown voltage rating.

In accordance with various embodiments, the number of rectifiers stages that are cascaded is not limited by the voltage breakdown rating of the dc-blocking capacitor at one or more of the stages, such as at the top and bottom stages, and therefore the output voltage of the power converter can exceed twice the voltage breakdown rating of the respective capacitor of one or more the rectifier circuits 224. In specific embodiments, including those described above, the output voltage Vout can greater than twice the voltage rating of DC-isolation capacitors $C_{Bt}$ and $C_{Bb}$, as illustrated by FIG. 2B due to additional DC isolation provided by the inductive isolation circuits 222. To achieve the higher output voltage, various embodiments include the air-core transformer which acts as the additional DC-isolation barrier. Without the additional DC isolation, the output voltage $V_{out}$ can be up to twice the voltage rating of DC-isolation capacitors $C_{Bt}$ and $C_{Bb}$ as the voltage stress on capacitors of top and bottom rectifiers (of the stack as illustrated by FIG. 2A) is half of the total output voltage, provided that the isolated total output voltage diverges symmetrically toward positive and negative directions. In general, when the number of cascaded class-DE rectifiers is N and DC-blocking capacitances are much larger than the diode junction capacitances, the voltage stress on n-th stage capacitors are expressed as follows:

$$\text{Voltage stress on } C_{Bt,n} = \left| \frac{n-1}{N} - \frac{1}{2} - \frac{1}{2N} \right| V_{out},$$

where $n = 1, 2, \ldots, N$, and $$\text{Voltage stress on } C_{Bb,n} = \left| \frac{n-1}{N} - \frac{1}{2} \right| V_{out},$$

where $n = 1, 2, \ldots, N$

As a specific example, assume that the DC-blocking capacitors in FIG. 2B are rated to withstand +5 kV and −5 kV respectively. Without the use of the further DC isolation provided by the inductive isolation circuit 222 of FIG. 2A, no matter how many rectifier stages are connected, the total output voltage of this multi-stage rectifier cannot exceed 10 kV without operating capacitors of top and bottom rectifiers under a voltage stress of 5 kV or larger. The additional DC isolation, provided by the inductive isolation circuits 222, allows for the multi-stage rectifier to exceed 10 kV by cascading multiple units of the multi-stage class-DE rectifiers. Using this configuration, a high output voltage (e.g., greater than two times of capacitor breakdown voltage rating) is provided. The limit of the achievable voltage is now the breakdown voltage of the inductive isolation barrier between the transformer's primary and secondary windings. In specific embodiments, the achievable voltage (e.g., the DC output voltage signal) is greater than two times, three times, four times, five times, six times or more of the voltage breakdown rating.

In accordance with the various embodiments described above, the apparatuses can be used to implement a variety of methods. An example method includes providing from a DC voltage input signal, at least one AC signal, and using a first circuit and a second circuit in parallel, each providing inductive isolation and each driven in response to power from the at least one AC signal, and each rectifying in response to the inductive isolation by outputting a rectified signal at an associated pair of output terminals. As previously described, the respective rectifiers circuits are connected via output circuitry that connects the input terminals of the rectifiers in parallel and the output terminals in series. The rectifying associated with at least one of the first circuit and second circuits is associated with circuitry characterized as being limited by a voltage breakdown rating. The method further includes providing a DC output voltage signal between voltage source terminals by cascading a plurality of signals, including the (e.g., first and second) rectified signals, with the DC output voltage signal being dependent on the rectified signals and greater than the voltage breakdown rating.

Additionally, the above described apparatus can be used in a variety of applications, such as various systems, apparatuses, and/or methods. Some example systems, apparatuses, and/or methods include an Electrostatic Precipitator (ESP), x-ray sources and neutron generators for airport security, ordinance and explosive detections, and medical equipment, such as dental X-ray or Computed Tomography (CT) scanners.

As a specific example, an ESP is an air filtering device that uses high voltages to electrostatically charge dust particles to subsequently remove them. ESP represents a viable solution to indoor air pollution problem which kills 4.3 million people every year. ESP designs using a power converter in accordance with various embodiment can occupy a less space and/or require lower supply of high-power electricity, allow for the miniaturization and utilization of ESPs in rural areas in developing countries.

CT scanners include another specific example. To obtain images of a human body, a CT scanner uses X-ray produced from a high electric field. CT scanning comes with potentially harmful radiation exposure to the patient. While radiation level can be reduced by rapidly pulsing the X-ray source, a CT scanner using a power converter in accordance with various embodiments can provide sufficiently fast rise and fall times (e.g., 10 to 100 us). Such example CT scanners can reduce the CT scanning time required per patient in a clinical setting as the scanner rotates faster, and which also decreases mechanical stress on the rotating part. In such embodiments, the weight and size of the electronic devices mounted thereon is reduced, which allows the system to rotate faster and reduces the scanning time.

Another specific example includes an Electro-hydrodynamic (EHD) Ion-Propelled Aircraft. An EHD ion-propelled aircraft is an emerging aerospace application of which the thrust is produced by multiple electrode pairs ionizing air molecules. EHD can potentially lead to silent unmanned aerial vehicles which may prove useful in military settings. To realize this, a power supply is used that is light enough to fly, but at the same time, can provide power in the level of hundreds of watts and voltage close to 100 kV to the aircraft.

Other systems, apparatuses, and/or methods can include high power electronics used in security scanners that use X-ray, ion and neutron sources. Such scanners can be used for freight inspections at airports, borders, checkpoints, etc. If made into a hand-held device, such scanners can be useful to bomb disposal technicians or law enforcement personnel, such as border security officers. High-performance neutron generators can also benefit oil industries since they are widely used in petroleum well logging operations.

Embodiments are not so limited and can include a variety of applications related to a small, lightweight, and fast transient response high-voltage power (e.g., DC-DC) converter and/or methods thereof.

More Detailed/Experimental Embodiments

As described above, various embodiments are directed to an apparatus involving power conversion. In specific embodiments, the apparatus has a plurality of stack rectifier circuits (e.g., multi-stage DE rectifiers, such as the 300 V class-DE resonant rectifier illustrated by FIG. 2B, in series). The apparatus can include an air-core transformer which acts as an additional DC isolation barrier. FIG. 2B, as described above, and as further illustrated by Appendix A of the underlying provisional, illustrates an example 300 V class-DE resonant rectifier with capacitive DC isolation, which can be used in a high voltage generator. Since the rectifier diodes and output terminals are DC-isolated from the input, a plurality of units (e.g., 20 units) of a 300 V rectifier can be stacked, as shown in FIG. 2B and FIG. 1b for Appendix A, to create a 6 kV voltage output. Using an example apparatus as illustrated by FIG. 2A, a high output voltage can be generated because the limit of the achievable voltage is now the breakdown voltage of the inductive isolation barrier between the transformer's primary and secondary windings.

The apparatus, which can include an inverter circuit, as described herein, converts DC input to a high frequency AC voltage, in various specific embodiments. The apparatus can include a full bridge resonant invertor implemented for the DC-AC stage. Various embodiments are directed to an apparatus having an inverter circuit, a plurality of stacked rectifier circuits, and a transformer circuit. An example of a PCB transformer design is further illustrated by FIG. 4A, as well as FIGS. 3a-3d of Appendix A.

Various experimental embodiments are directed to a multi-level class-DE rectifier structure with inductive isolation. A high frequency operation allows fast transient response in the output voltage. The input-parallel output-series architecture using the air-core PCB transformer with high DC voltage blocking capability leads to high achievable output voltage of the DC-DC converter. A 60 V-to-6 kV dc-dc converter is demonstrated at 1.25 MHz switching frequency capable of delivering 36 W of power to the load and a high-gain DC-DC converter in a multi-level configuration that delivers 35 kV voltage and 203 Watts (W) power to the load while maintaining 73 percent efficiency and can pulse the output at 296 microseconds (μs) rise time.

Figure 3:
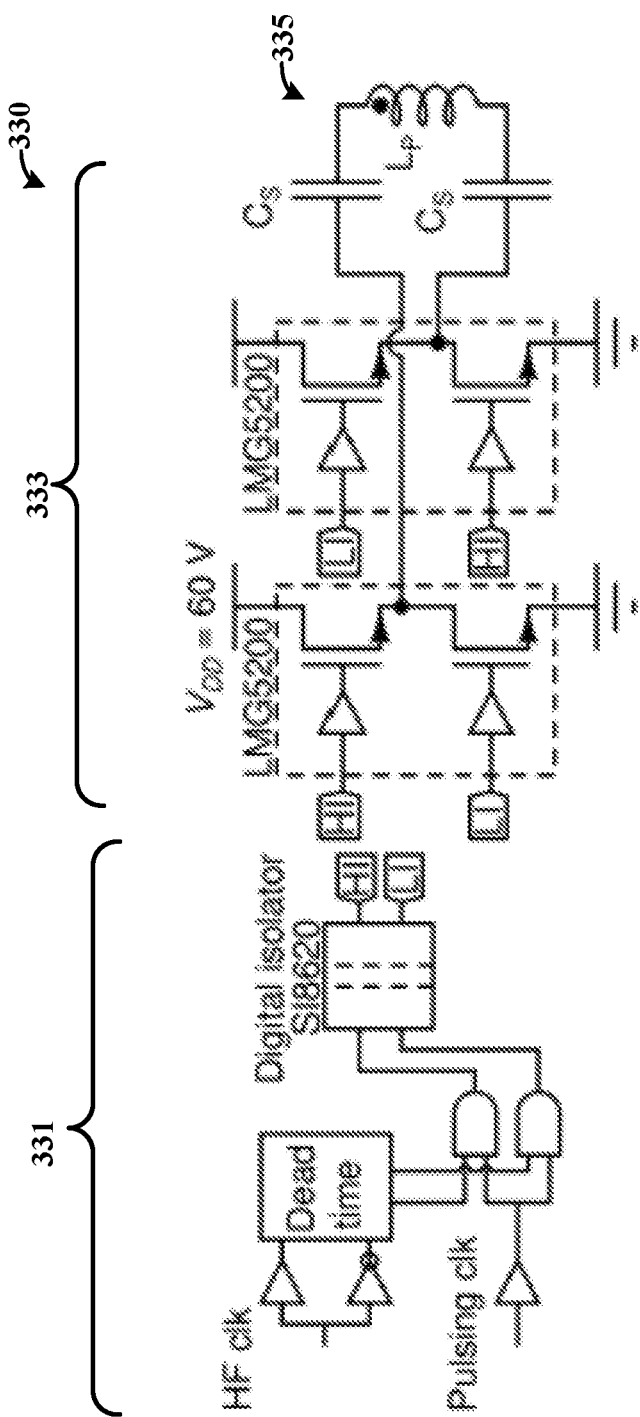
FIG. 3 shows example front-end driver circuitry of an apparatus, in accordance with various embodiments of the present disclosure.

FIG. 3 shows example front-end driver circuitry of an apparatus, in accordance with various embodiments of the present disclosure. As previously described, the front-end driver circuitry 330 provides the at least one AC signal to the first inductive isolation circuit and the second inductive isolation circuit, thereby driving the respective first and second inductive isolation circuits. The front-end driver circuitry 330 can include one or more DC-AC inverter circuits or one or more AC-AC inverter circuits, as previously described.

As shown by the specific example of FIG. 3, the front-end driver circuitry 330 includes a DC-AC inverter that converts a DC input to a high frequency AC voltage using a gate driver (e.g., a gate signal generator) 331 and power stage 333. The DC-AC inverter is coupled to at least a portion of the inductive isolation circuitry 335, which is herein referred to as "the primary side."

The DC-AC inverter, illustrated by FIG. 3, is a full bridge resonant inverter is implemented for the DC-AC stage. As the DC input VDD is 60 V, in the specific embodiment, two 80 V half-bridge circuits are used to form the full bridge. Each half bridge can be implemented using a GaN power stage 333 with an integrated gate driver 331. To maintain symmetry, the resonant capacitance are provided by two capacitance in series. Based on the printed circuit board (PCB) planner transformer parameter, as further shown below, the series leakage inductance on the primary side, in specific embodiments 1.7 microhenries (μH). To provide the series resonant frequency to be 1 megahertz (MH), the series resonance capacitance is 15 nanofarads (nF) and each of capacitance Cs is 30 nF. For each Cs, a 22 nF ceramic capacitor and a 8.2 nF ceramic capacitor can be put in parallel. The low voltage input signals from the timing circuit are isolated from the GaN half-bridge modules using a digital isolator. An isolated 5 V is provided to the dead time and pulsing circuits using a pushpull transformer driver. Tables I and II of the Appendix A of the underlying provisional provided example inverter design for the isolated 5 V supply and example transformer layouts, in accordance with various experiment embodiments, and for which the present application is not limited to.

FIGS. 4A-4C show example inductive isolation circuitry of an apparatus, in accordance with various embodiments of the present disclosure. More specifically, FIG. 4A illustrates an example PCB layout 450 of a transformer for both the primary side winding (e.g., front-end driver side) and the secondary side winding (e.g., rectifier side). As may be appreciated, the transformer can be a coupled coil model. The transformer includes an air-core planar PCB transformer that provides the inductive isolation. The PCB layout of the primary winding on the inverter side and the secondary winding on the rectifier side both include top copper, bottom copper, and vias. Table II of the Appendix A of the underlying provisional lists geometrical parameters of the transformer layout.

The specific cross-sectional view of the transformer, as shown by FIG. 4A, illustrates the placement of 3 mil- (76.2 µm-) thick Kapton sheets each of which is rated at 4.5 kV/mil dielectric strength. In specific experimental embodiments, as further described herein, four sheets of 3 mil (76.2 µm) Kapton sheets are used between two transformer windings to provide DC blocking capability of 54 kV. The first two Kapton sheets from the top cover the bottom side of the rectifier in order to prevent or mitigate arcing between rectifiers when DC-DC converters are stacked. Similarly, two Kapton sheets at the bottom are bent over to cover the bottom side of the inverter to provide DC blocking between the inverter and the primary winding of the DC-DC converter underneath in the multi-level configuration. Two ounce copper- (71 micron-) can be used for the trace implementation. In general, thicker copper is used because the AC resistance of the transformer winding at megahertz frequency is inversely proportional to the copper thickness. This is because of the current crowding toward the inner side of the copper trace at high frequency.

In specific experimental embodiments, circuit boards and Kapton sheets are fastened together by nylon screws and nuts. To prevent or mitigate arcing through screw holes, the screw holes are filled with high voltage insulating coating. By following this design, a transformer is obtained with $Lp=7:1$ µH, $Ls=99:7$ µH, and $k=0:87$. FIG. 4B shows this coupled inductor model, and FIG. 4C shows the equivalent leakage and magnetizing inductance model of the transformer.

Figure 5B:
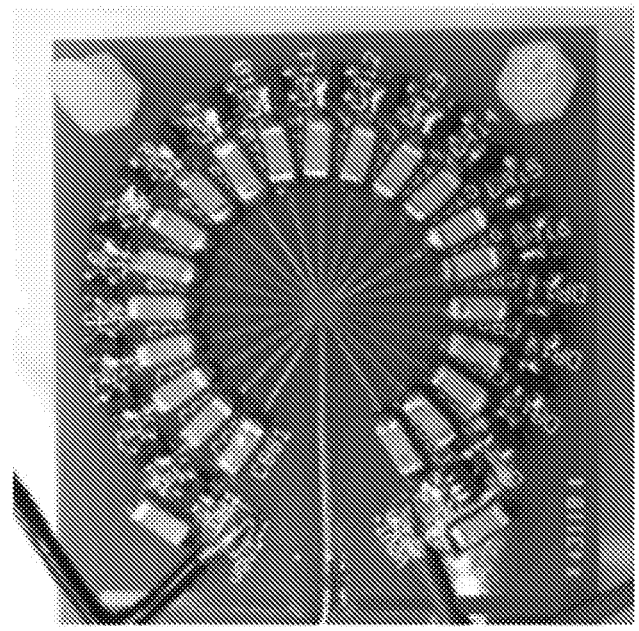
FIGS. 5A-5B illustrates experimental examples of a multi-stage rectifier of an apparatus, in accordance with various embodiments of the present disclosure.
Figure 5A:
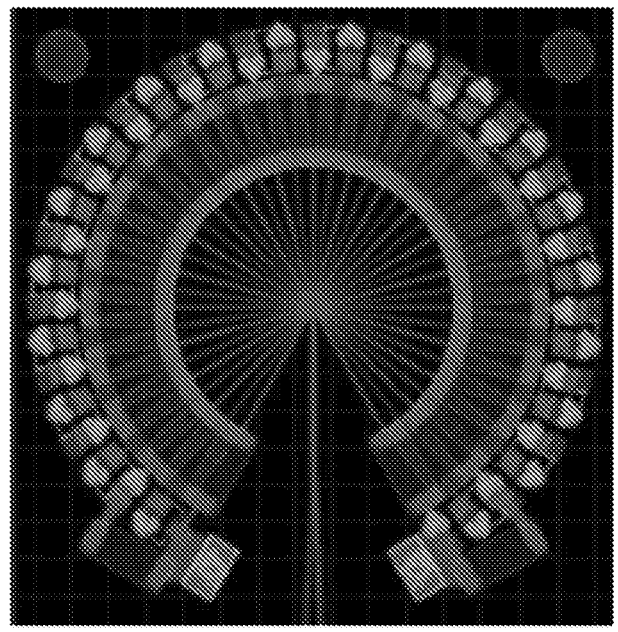

FIGS. 5A-5B illustrates experimental examples of a multi-stage rectifier of an apparatus, in accordance with various embodiments of the present disclosure. More specifically, FIGS. 5A-5B illustrate an example of a 20-stage cascaded class-DE rectifier for 6 kV DC output. FIG. 5A is a PCB layout and FIG. 5B is a picture from an experimental embodiment. The 20-stage cascaded class-DE rectifier, illustrated by FIG. 5A-5B include DC-blocking capacitors, such as $C_{Bt}$ and $C_{Bb}$ as previously illustrated by FIG. 2B. In specific experimental embodiments, the DC-blocking capacitors are 33 picofarads (pF) $X_1Y_2$-rated capacitors. For the diodes, such as those marked as D in FIG. 2B, two 240 V Si Schottky diodes are connected in series as a single 480 V-rated rectifying device. Table III of Appendix A of the underlying provisional lists the part numbers of the components.

Various experimental embodiments are directed to 60 V-to-6 kV power converters, 60 V-to-24 kV power converters, 60 V-to-30 kV power converters, and 60 V-to-35 kV power converters. The rectifiers can be single-level or multi-level cascaded. In specific experimental embodiments, the 60 V-to-6 kV power converter can be 6 inches by 2 inches (e.g., 15 cm by 5 cm). The 60 V-to-35 kV DC-DC converter is implemented by stacking six 60 V-to-6 kV DC-DC converters) and having multiple levels of converters cascaded.

In various embodiments, the 60 V-to-radio frequency (RF) inverter, the transformer, and the RF-to-6 kV rectifier previously described to make a 60 V-to-6 kV DC-DC converter are combined. Insulating varnish can be applied to screw holes.

Additionally, multiple 60 V-to-6 kV DC-DC converters can be stacked in a multi-level configuration. Four levels up to six levels of DC-DC converters can be stacked. Multiple units of 6 kV rectifiers are connected in series and 60 V inverters are connected in parallel. Example experimental dimensions of the six-level converter is 8 inches×2.5 inches×2 inches (20 cm×6 cm×5 cm) in width, length, and height respectively. The weight of the converter is 188 g, although embodiments are not so limited.

Various experimental embodiments involve power supplies, probes and oscilloscopes connected to a DC-DC power converter under test. Since the experiments involve high voltage in the range of tens of kV, special care is taken to ensure that the experimenter is not exposed to any electrical or physical hazard. The high-voltage DC-DC converter and the load by a grounded Faraday cage that is shorted to a nearby water pipe. Also, an acrylic sheet is set up between the experimenter and the high-voltage converter to prevent possible injury from flying sparks or debris in case of (unlikely) catastrophic failure. A differential probe (model number CT4079; manufactured by Elditest) is used that can measure a voltage up to ±15 kV. Because of the limit in the probe's voltage rating, the voltage measure of either one or two resistor units of the resistor chain is used (each unit of the resistor is 1 M). The measured voltage is scaled up by the voltage division ratio to estimate the end-to-end voltage applied to the resistor chain.

Figure 6A:
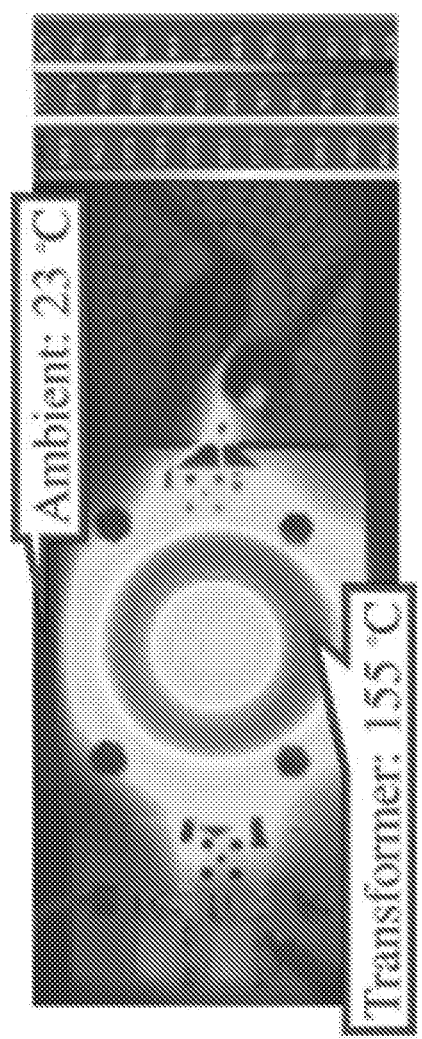
FIGS. 6A-6C illustrates example experimental results of a power converter, in accordance with various embodiments of the present disclosure.
Figure 6B:
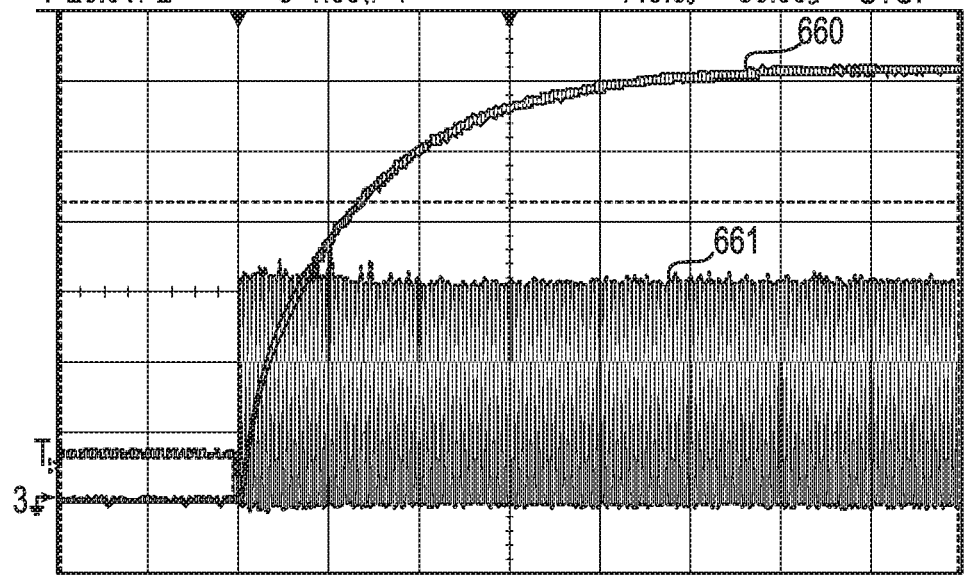
Figure 6C:
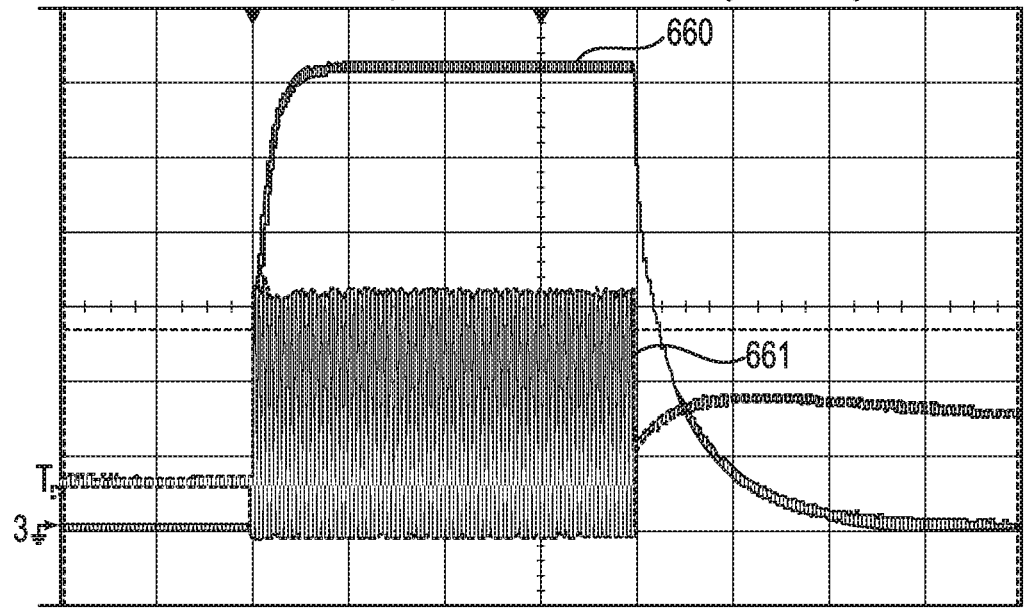

FIGS. 6A-6C illustrates example experimental results of a power converter, in accordance with various embodiments of the present disclosure. More specifically, FIGS. 6A-6C illustrate experimental results of a 60 V-to-6 kV DC-DC power converter. Although the converter peaks its output voltage at 0.9-1 MHz switching frequency range, the switching frequency of 1.25 MHz is used in order to achieve the reasonably high output voltage and fast rise time simultaneously. Using 6.1 kV output voltage, 37 W power is delivered to 1 M resistor for the load.

FIG. 6A illustrates a thermal image of the transformer after three minutes of continuous operation of the DC-DC power converter at 6 kV and 36 W output. More specifically, the illustrated image is of a 60 V-to 6 kV DC-DC power converter. The temperature of the planar PCB transformer increased slowly but steadily throughout the operation, and it reached 155 degrees Celsius (C) after three minutes of continuous operation at which point the converter is turned off to avoid damaging the transformer. In the specific experimental embodiment, FR4 board is used with Tg rating of 130 degrees C.

FIG. 6B illustrates the waveforms of the output voltage and the inverter half-bridge output at the converter turn-on moment, from which the ten percent to ninety percent rise time is measured to be 135 µs. The waveforms illustrated include the output voltage 660 (blue) and the inverter half-bridge output 661 (yellow) at the converter turn-on with a horizontal scale of 50 µs/div and a vertical scale 1 kV/div. FIG. 6C illustrates the zero-to-6 kV pulsed operation of the converter, e.g., shows a pulsed operation of the converter. The output voltage in a steady state is 6.08 kV, and the DC-to-DC efficiency is 81 percent. Various experiments are directed to 60 V-to-24 kV, 60 V-to-20 kV and 60 V-to-35 kV DC-DC converter in multi-level configuration. In such experimental embodiments, the number of stacked DC-DC converter units is varied from four to six and the performance of each configuration is measured.

Figure 7A:
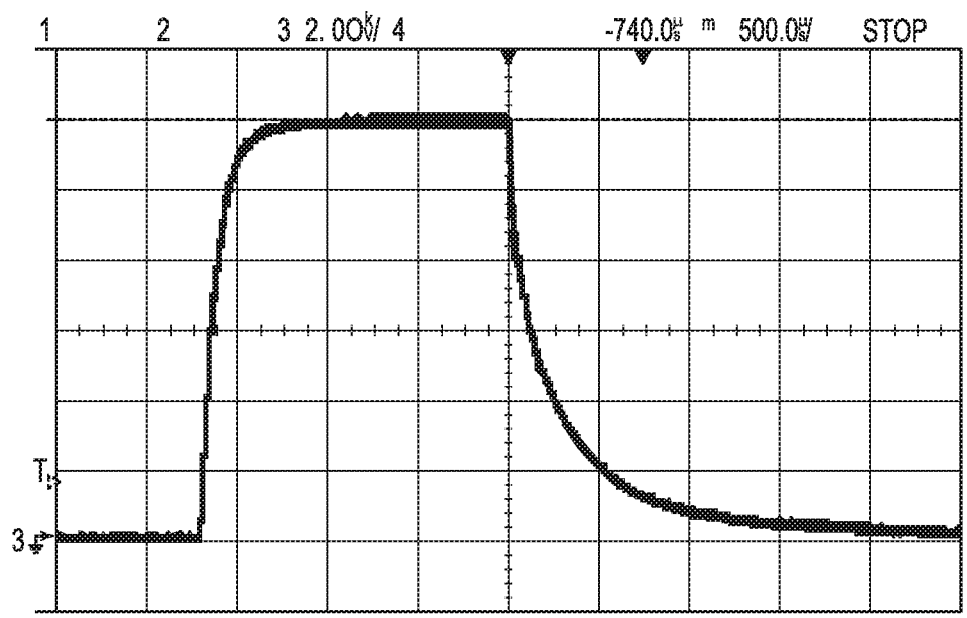
FIGS. 7A-7D illustrates example experimental results of another power converter, in accordance with various embodiments of the present disclosure.
Figure 7B:
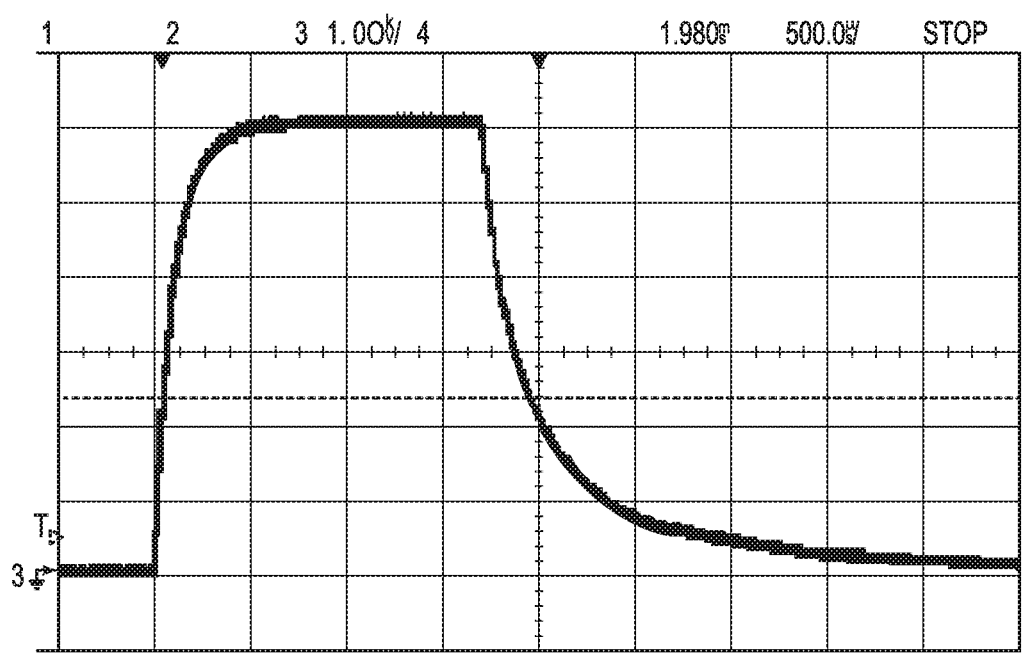
Figure 7C:
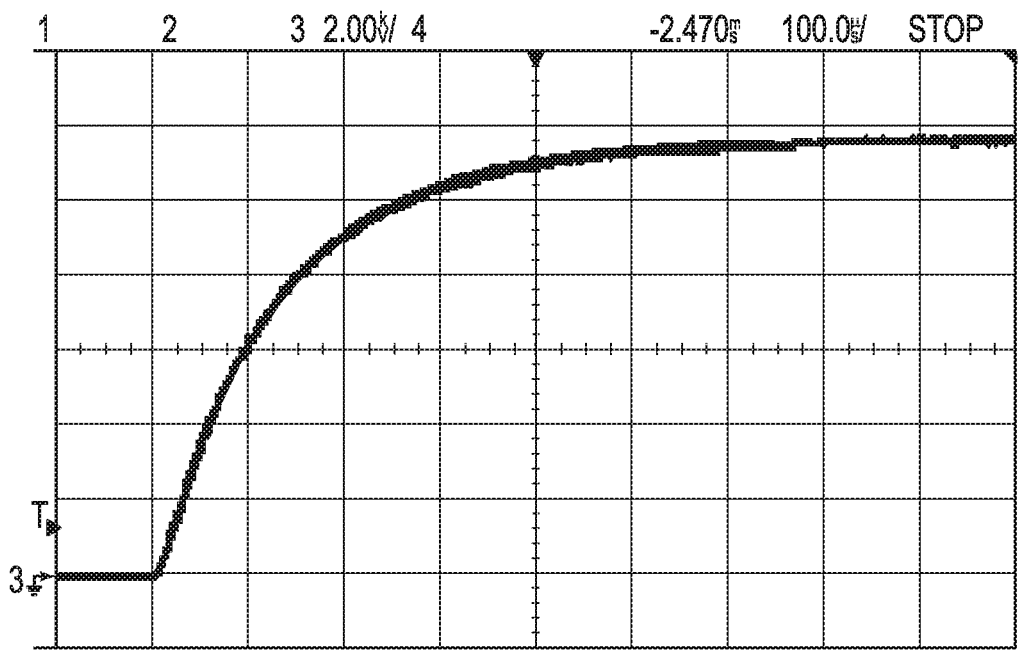
Figure 7D:
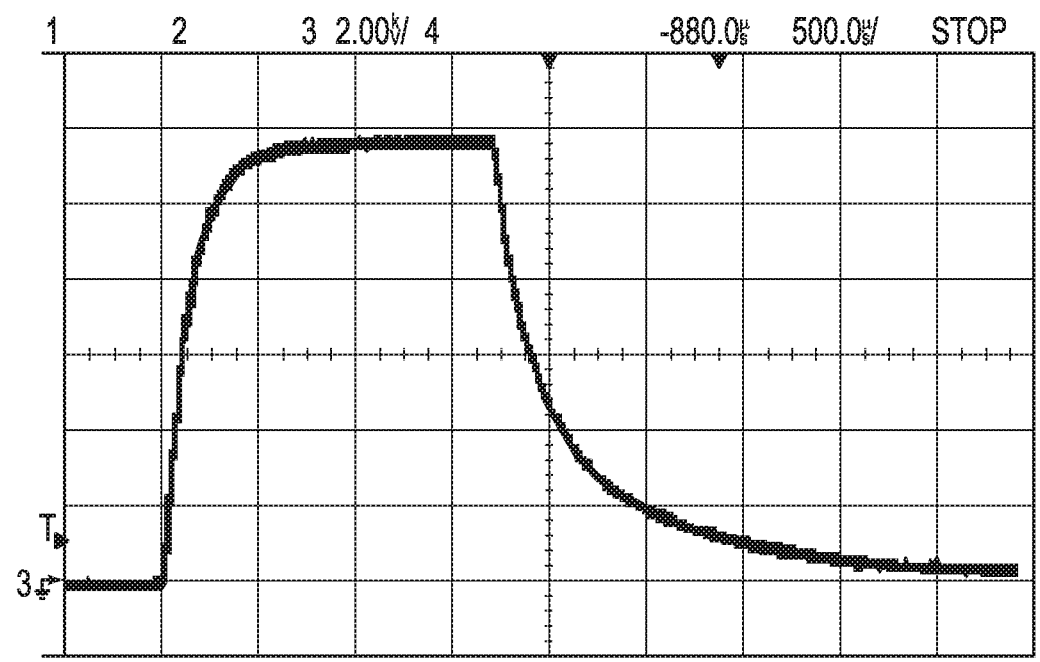

FIGS. 7A-7D illustrates example experimental results of another power converter, in accordance with various embodiments of the present disclosure. More specifically, FIGS. 7A-7D shows output voltage waveforms of four-level, five-level, and six-level cascaded converters, from which the output voltages at the steady state are measured to be 23.9 kV, 30.4 kV, and 35.0 kV. FIG. 7A illustrates pulsed operation of the four-level 60 V-to-24 kV DC-DC converter. The horizontal scale is 500 µs/div and the vertical scale is 4 kV/div (the voltage is scaled down by 2:1 on the screen). FIG. 7B illustrates pulsed operation of the five-level 60 V-to-30 kV DC-DC converter. The horizontal scale is 500 µs/div and the vertical scale is 5 kV/div (the voltage is scaled down by 5:1 on the screen). FIG. 7C illustrates the turn-on moment of the six-level 60 V-to-35 kV DC-DC converter. The horizontal scale is 100 µs/div and the vertical scale is 6 kV/div (the voltage is scaled down by 3:1 on the screen). FIG. 7B illustrates pulsed operation of the six-level 60 V-to-35 kV DC-DC converter. Horizontal and vertical scales are the same as those in FIG. 7C.

Figures 8A, 8B:
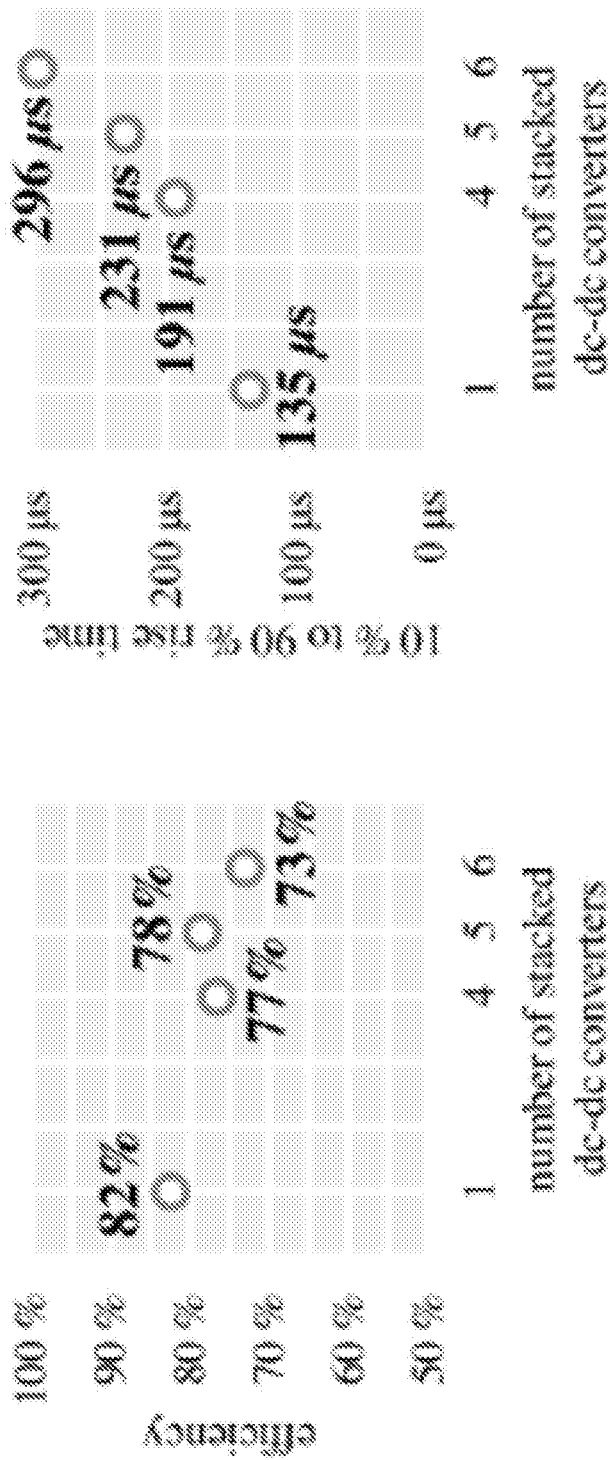
FIGS. 8A-8B illustrates example experimental performance results of another power converter, in accordance with various embodiments of the present disclosure.

FIGS. 8A-8B illustrates example experimental performance results of another power converter, in accordance with various embodiments of the present disclosure. More specifically, FIGS. 8A-8B illustrate performance variation of DC-DC converters at different numbers of 6 kV units stacked, with FIG. 8A illustrating the efficiency variation and FIG. 8B illustrating the ten percent to ninety percent rise time variation. The efficiency tends to decrease with the number of stacked units, from 82 percent in a single 6 kV unit down to 73 percent in the six-level configuration. One of possible reasons of this efficiency drop may be the close stacking of these multiple transformers causes the high frequency current distribution in the transformer winding to be different from the single stage case, and this increases the conduction losses in the planner PCB transformer. The rise time of the converter tend to increase with the number of stacked units, from 135 µs in a single unit to 296 µs in the six units cascaded. This increase is mainly attributed to the stray capacitance between the transformer primary and the secondary windings which is charged up to half the voltage of the DC-DC converter output at the turn-on.

As previously described, the above-described apparatus can be implemented in a variety of systems and other devices. Example systems include a CT scanner gantry, ion source (e.g., Xray source for medical imaging, linear accelerator, neutron generator for bomb detection, drill head imaging for oil logging and geological exploration), electrostatic adhesion (e.g., portable high voltage power supplies that enable electrostatic adhesion application such as materials handling, robotic grippers, and drone perching), TWT power supplies, electrostatic filters, electrostatic sprayer (e.g., use of large electric fields to ionize particles for adhesion in coating applications), electro-hydrodynamic propulsion (e.g., use of large electric fields to ionize and accelerate air to create thrust for aeronautical propulsion), high power laser power supplies, tasers, particle accelerometers, plasma generations (e.g., for control surfaces, modifying airstreams in aerodynamic applications), capacitor charging, and ozone generation.

Figure 9:
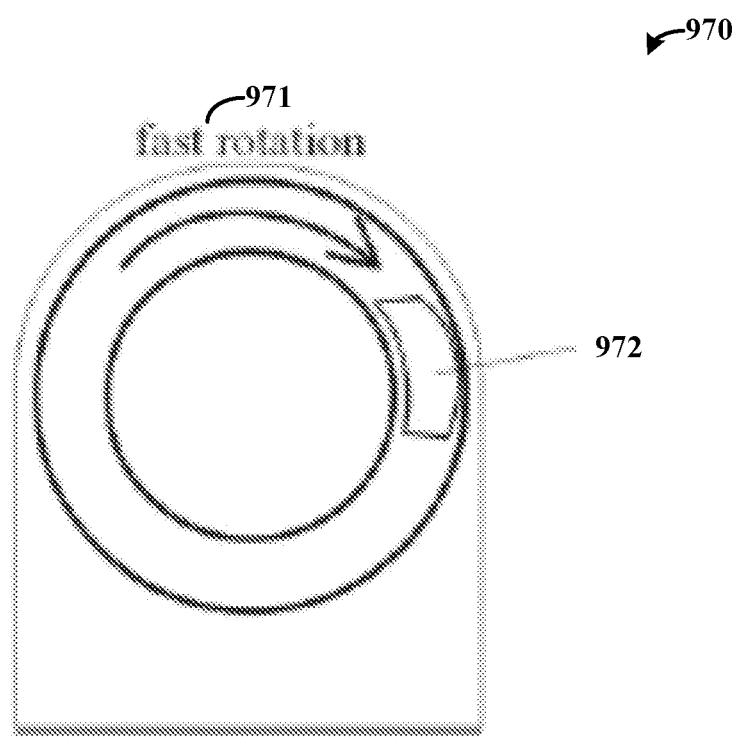
FIG. 9 illustrates an example of a computed tomography (CT) scanner gantry having an apparatus, in accordance with various embodiments.

FIG. 9 illustrates an example of a CT scanner gantry having an apparatus, in accordance with various embodiments. The CT scanner gantry 970 includes one or more of the above-described apparatuses that forms part of the high voltage generator 972. The CT scanner gantry, which utilizes the above-described power conversion apparatus, is of a smaller size and weight then other solutions and which allows for faster rotation 971 of the gantry. Faster rotation results in reduced radiation dose to the patient. Using the CT scanner gantry 970, in accordance with various embodiments, can result in lower radiation dose to a patient.

Figure 10:
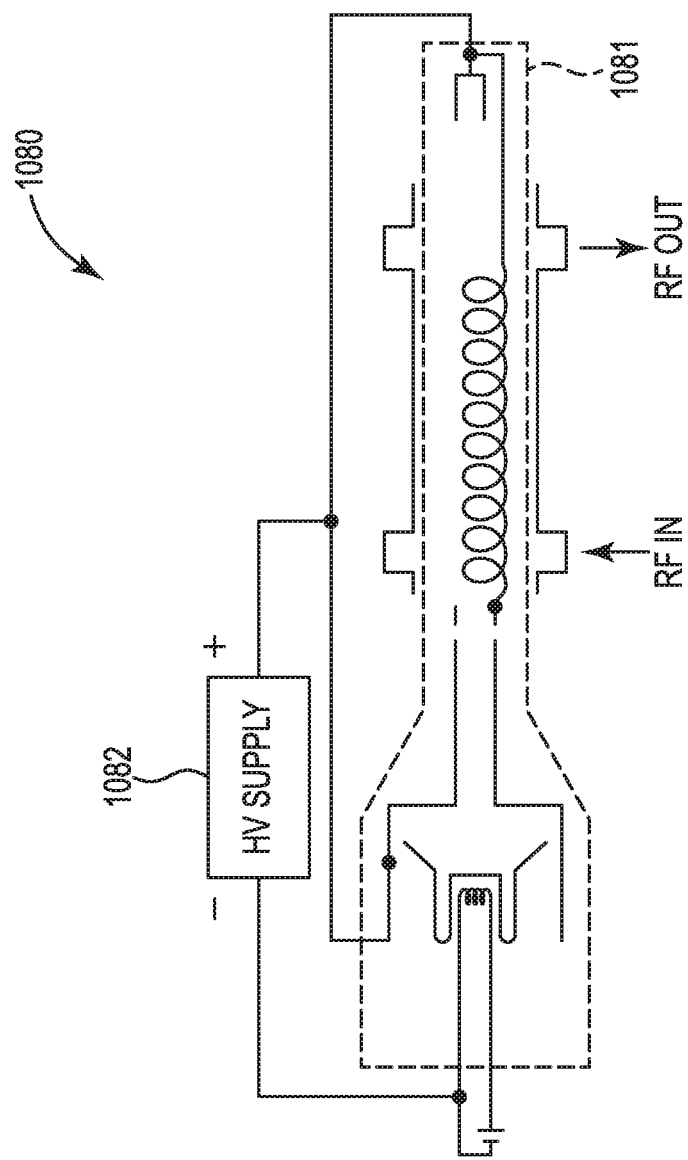
FIG. 10 illustrates an example traveling wave tube (TWT) radar power supply, in accordance with various embodiments.

FIG. 10 illustrates an example traveling wave tube (TWT) radar power supply, in accordance with various embodiments. TWT radar power supplies that utilize the above-described apparatus 1080 can be of a reduced size, which allows for more powerful radar systems to be used in mobile applications or putting such radar on smaller vehicles (e.g. drones, automobiles, etc.) that have historically too large due to system size and weight. The apparatus 1080 includes the TWT 1081 and the HV supply 1082 which includes the above described power converter.

Embodiments herein are not limited to the specific example systems and/or methods, as illustrated by FIGS. 9-10, as well as Appendix B and Appendix C illustrate example systems and/or methods that involve power conversion and that can be used in, in accordance with various specific embodiments As described herein, various embodiments are directed to multi-level class-DE rectifier circuitry with inductive isolation. A high frequency operation can allow for fast transient response in the output voltage. The input-parallel output-series architecture using the air-core PCB transformer with high DC voltage blocking capability leads to high output voltage of the DC-DC converter. Specific experimental embodiments demonstrate a 60 V-to-6 kV DC-DC converter at 1.25 MHz switching frequency capable of delivering 36 W of power to the load and a high-gain dc-dc converter in a multi-level configuration that can deliver 35 kV voltage and 203 W power to the load while maintaining 73% efficiency and can pulse the output at 296 us rise time.

Various embodiments are implemented in accordance with the underlying Provisional Application (Ser. No. 62/639,865), entitled "Apparatuses and Methods Involving a Power Converter that includes a Multi-stage Rectifier", filed Mar. 7, 2018, and with three Appendices, to which benefit is claimed and which are fully incorporated herein by reference. For instance, embodiments herein and/or in the provisional application (including the appendices therein) may be combined in varying degrees (including wholly). Reference may also be made to the experimental teachings and underlying references provided in the underlying provisional application, including the Appendices that form part of the provisional application. Embodiments discussed in the Appendices are not intended, in any way, to be limiting to the overall technical disclosure, or to any part of the claimed invention unless specifically noted.

The Appendices of the underlying Provisional Application are hereby fully incorporated by reference for their general and specific teachings. Appendix A entitled "60 V-to-35 kV Input-Parallel Output-Series DC-DC Converter Using Multi-Level Class-DE Rectifiers", generally and specifically describes various power converters, rectifiers, multi-level rectifier stacks, inverter, and methods of use as illustrated here. Appendix B entitled "High-Voltage High-Gain DC-DC Converter with Inductive Isolation for Multi-Level Cascade of Class-DE Rectifiers", generally and specifically describes applications of power converters as illustrated herein. Appendix C entitled "High Voltage Generator", generally and specifically describes uses and applications of power converters including high voltage generators as illustrated herein. These documents are fully incorporated herein by reference for their teachings (including background references cited therein and which disclose applications beneficial to aspects of the present disclosure), generally and specifically, to the structures, processes, methods and uses described and shown therein.

Various blocks, modules or other circuits may be implemented to carry out one or more of the operations and activities described herein and/or shown in the figures. In these contexts, a "block" (also sometimes referred to as "logic circuitry" or "module") is a circuit that carries out one or more of these or related operations/activities (e.g., as depicted in one or more blocks, or circuit components, as shown in FIG. 1). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions, and the second module includes a second CPU hardware circuit with another set of instructions.

Certain embodiments are directed to a computer program product (e.g., non-volatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, various imaging processing circuits may be implemented as discussed herein. In addition, the various embodiments described herein may be combined in certain embodiments, and various aspects of individual embodiments may be implemented as separate embodiments. Such modifications do not depart from the true spirit and scope of various aspects of the disclosure, including aspects set forth in the claims.

What is claimed is:

1. An apparatus comprising:
    DC-AC inverter circuitry configured to invert at least one direct-current (DC) input signal corresponding to an input voltage to at least one alternating-current (AC) signal;
    a first circuit including a first inductive isolation circuit to be driven in response to power from the at least one AC signal, and including a first rectifier circuit to respond to the first inductive isolation circuit by outputting a first rectified signal at a first pair of output terminals;
    a second circuit including a second inductive isolation circuit to be driven in response to power from the at least one AC signal, and including a second rectifier circuit to respond to the second inductive isolation circuit by outputting a second rectified signal at a second pair of output terminals, and at least one of the first and second rectifier circuits characterized as being limited by a voltage breakdown rating; and
    output circuitry configured and arranged to provide a DC output voltage signal between voltage source terminals and to cascade a plurality of signals, including the first and second rectified signals, by one of the output terminals of one of the pairs of output terminals being a source of supply to one of the output terminals of the other of the pairs of output terminals, with the voltage source terminals to provide a voltage source that is dependent on the first and second rectified signals and greater than the voltage breakdown rating of the at least one of the first and second rectifier circuits.

2. The apparatus of claim 1, wherein at least one of the first and second inductive isolation circuits is associated with another voltage breakdown rating which is greater than the voltage breakdown rating of the at least one of the first and second rectifier circuits.

3. The apparatus of claim 1, wherein the at least one of the first and second rectifier circuits is configured and arranged to deliver in the associated rectified signal, a DC output voltage signal that is greater than twice the voltage breakdown rating of the at least one of the first and second rectifier circuits.

4. The apparatus of claim 1, wherein each of the first and second inductive isolation circuits includes an air-core transformer having an associated voltage breakdown rating that:
    is greater than the voltage breakdown rating of said at least one of the first and second rectifier circuits, and
    defines a minimum overall voltage breakdown rating for circuitry included in the first and second inductive isolation circuits.

5. The apparatus of claim 1, wherein the voltage breakdown rating is defined by a DC-blocking capacitor used in a signal path in one of the first and second circuits, between an output terminal of the inductive isolation circuit and a diode in the rectifier circuit.

6. The apparatus of claim 1, wherein each of the first and second rectifier circuits includes or is configured as a Class DE rectifier.

7. The apparatus of claim 1, further including additional rectifier circuits having outputs cascaded with the first and second rectifier circuits, and wherein each of the rectifier circuits includes or is configured as a Class DE rectifier, is dc-isolated from the input voltage and is rated at not less than 300 volts.

8. The apparatus of claim 1, further including at least one additional circuit including a third circuit having a third inductive isolation circuit to be driven in response to power from the at least one AC signal, and including a third rectifier circuit to respond to the third inductive isolation circuit by outputting a third rectified signal at a third pair of output terminals; and
    wherein the output circuitry is further configured and arranged to provide a DC output voltage signal between voltage source terminals and to cascade a plurality of signals, including the first, second and third rectified signals, by coupling selected ones of the output terminals of the first, second and third pairs of output terminals as being a cascaded source of supply, with the voltage source terminals collectively arranged to provide a voltage source that is dependent on the first, second and third rectified signals and that is greater than the voltage breakdown rating.

9. The apparatus of claim 1, wherein each of the first and second rectifier circuits is one of multiple rectifier stages connected in parallel.

10. A method comprising:
    providing from a direct-current (DC) voltage input signal, at least one alternating-current (AC) signal;
    using a first circuit and a second circuit in parallel, each providing inductive isolation and each driven in response to power from the at least one AC signal, and each rectifying in response to the inductive isolation by outputting a rectified signal at an associated pair of output terminals, wherein the rectifying associated with at least one of the first circuit and second circuits is associated with circuitry characterized as being limited by a voltage breakdown rating; and providing a DC output voltage signal between voltage source terminals by cascading a plurality of signals, including the rectified signals, with the DC output voltage signal being dependent on the second rectified signals and greater than the voltage breakdown rating.

11. A direct-current (DC) power source for providing a DC voltage in response to at least one alternating-current (AC) signal associated with an input voltage signal, the DC power source comprising:

a first circuit including a first inductive isolation circuit to be driven in response to power from the at least one AC signal, and including a first rectifier circuit to respond to the first inductive isolation circuit by outputting a first rectified signal at a first pair of output terminals;

a second circuit including a second inductive isolation circuit to be driven in response to power from the at least one AC signal, and including a second rectifier circuit to respond to the second inductive isolation circuit by outputting a second rectified signal at a second pair of output terminals, and at least one of the first and second rectifier circuits characterized as being limited by a voltage breakdown rating; and output circuitry configured and arranged to provide a DC output voltage signal between voltage source terminals and to cascade a plurality of signals, including the first and second rectified signals, by one of the output terminals of one of the pairs of output terminals being a source of supply to one of the output terminals of the other of the pairs of output terminals, with the voltage source terminals to provide a voltage source that is dependent on the first and second rectified signals and greater than the voltage breakdown rating of the at least one of the first and second rectifier circuits.

12. The DC power source of claim 11, further including front-end driver circuitry configured and arranged to provides the at least one AC signal to the first inductive isolation circuit and the second inductive isolation circuit.

13. The DC power source of claim 12, wherein the front-end driver circuitry includes one or more DC-AC inverter circuits configured and arranged to invert at least one DC input signal corresponding to the input voltage signal to the at least one AC signal and to drive the first inductive isolation circuit and the second inductive isolation circuit via the at least one AC signal.

14. The DC power source of claim 12, wherein the front-end driver circuitry includes one or more AC-AC inverter circuits configured and arranged to invert at least one AC input signal corresponding to the input voltage signal and a first frequency to the at least one AC signal corresponding to a second frequency and to drive the first inductive isolation circuit and the second inductive isolation circuit via the at least one AC signal at the second frequency.

15. The DC power source of claim 11, wherein each of the first and second inductive isolation circuits includes an air-core transformer having another voltage breakdown rating associated with material between the windings of the air-core transformer and that is greater than the voltage breakdown rating of said at least one of the first and second rectifier circuits.

16. The DC power source of claim 11, wherein the at least one of the first and second rectifier circuits includes a DC-blocking capacitor used in a signal path in one of the first and second circuits, between an output terminal of the inductive isolation circuit and a diode in the rectifier circuit, the DC-blocking capacitor characterized as being limited by the voltage breakdown rating.

17. The DC power source of claim 11, further including a plurality of circuits, including the first and second circuits, cascaded in an arrangement between voltage rails, and the at least one of the first and second rectifier circuits is respectively situated closet to one of the voltage rails.

18. The DC power source of claim 11, wherein input terminals of the first and second rectifier circuits are connected in parallel and the output terminals of the pairs of output terminals are connected in series via the output circuitry.

* * * * *